S. S. & W. W. TAINTER & G. P. STANLEY.
BOXING MACHINE.
APPLICATION FILED AUG. 23, 1909.

953,358.

Patented Mar. 29, 1910.

5 SHEETS—SHEET 2.

S. S. & W. W. TAINTER & G. P. STANLEY.
BOXING MACHINE.
APPLICATION FILED AUG. 23, 1909.

953,358.

Patented Mar. 29, 1910.
5 SHEETS—SHEET 5.

UNITED STATES PATENT OFFICE.

SIMON S. TAINTER, WILLIS W. TAINTER, AND GEORGE P. STANLEY, OF DIXFIELD, MAINE.

BOXING-MACHINE.

953,358.   Specification of Letters Patent.   Patented Mar. 29, 1910.

Application filed August 23, 1909.  Serial No. 514,137.

*To all whom it may concern:*

Be it known that we, SIMON S. TAINTER, WILLIS W. TAINTER, and GEORGE P. STANLEY, citizens of the United States, residing at Dixfield, in the county of Oxford and State of Maine, have invented a certain new and useful Improvement in Boxing-Machines, of which the following is a specification, reference being had therein to the accompanying drawings.

The invention relates to an improvement in machines for boxing tooth-picks and other small articles of somewhat similar shape.

As the machine is especially intended for use in boxing tooth-picks the invention is illustrated as embodied in a machine especially constructed for that purpose.

Wooden tooth-picks are usually put up and sold in small boxes containing approximately a definite quantity of tooth-picks. When the tooth picks are boxed by machinery it is important that mechanism be provided for measuring or furnishing a uniform quantity of picks for each box and that the picks shall be delivered to the box in such manner that they shall all be laid parallel with each other in the box.

In a patent issued to us No. 869,993, dated Nov. 5, 1907, there was shown and described mechanism of the general character above mentioned. The present invention is an improvement on the machine shown in said patent.

The invention will be fully understood from the following description taken in connection with the accompanying drawings, and the novel features will be pointed out and clearly defined in the claims of the specification.

Figure 1:
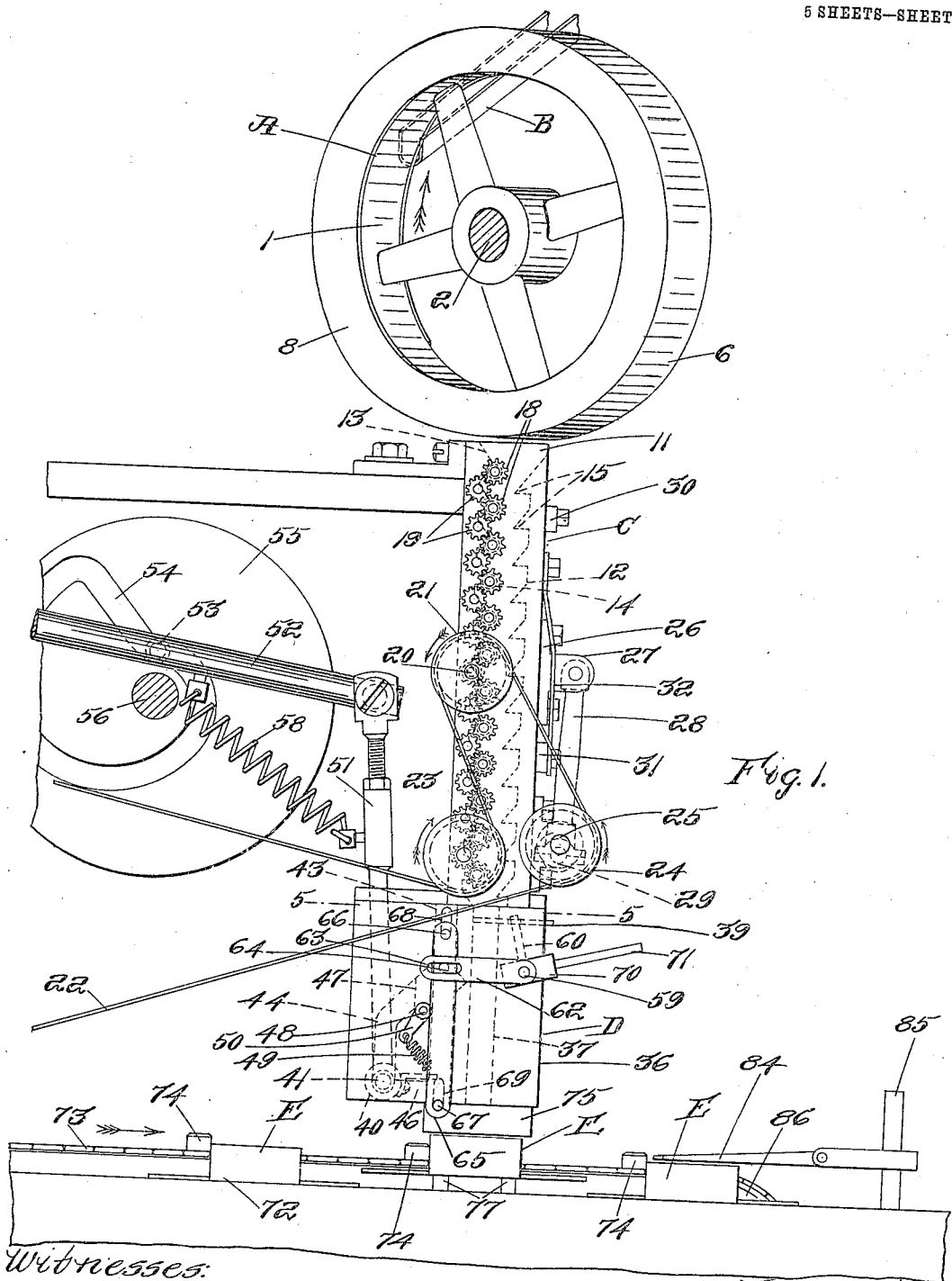
Figure 2:
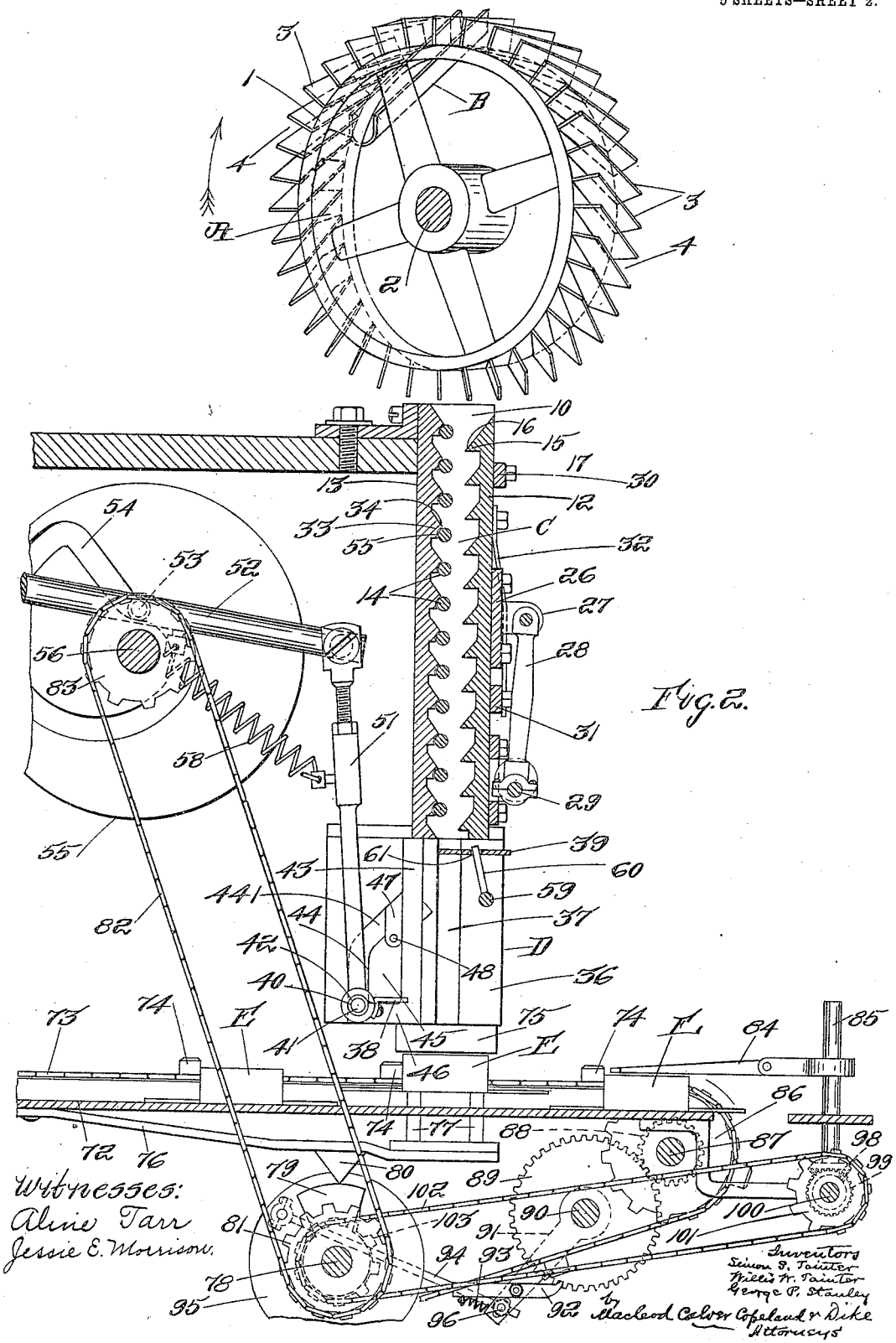
Figure 3:
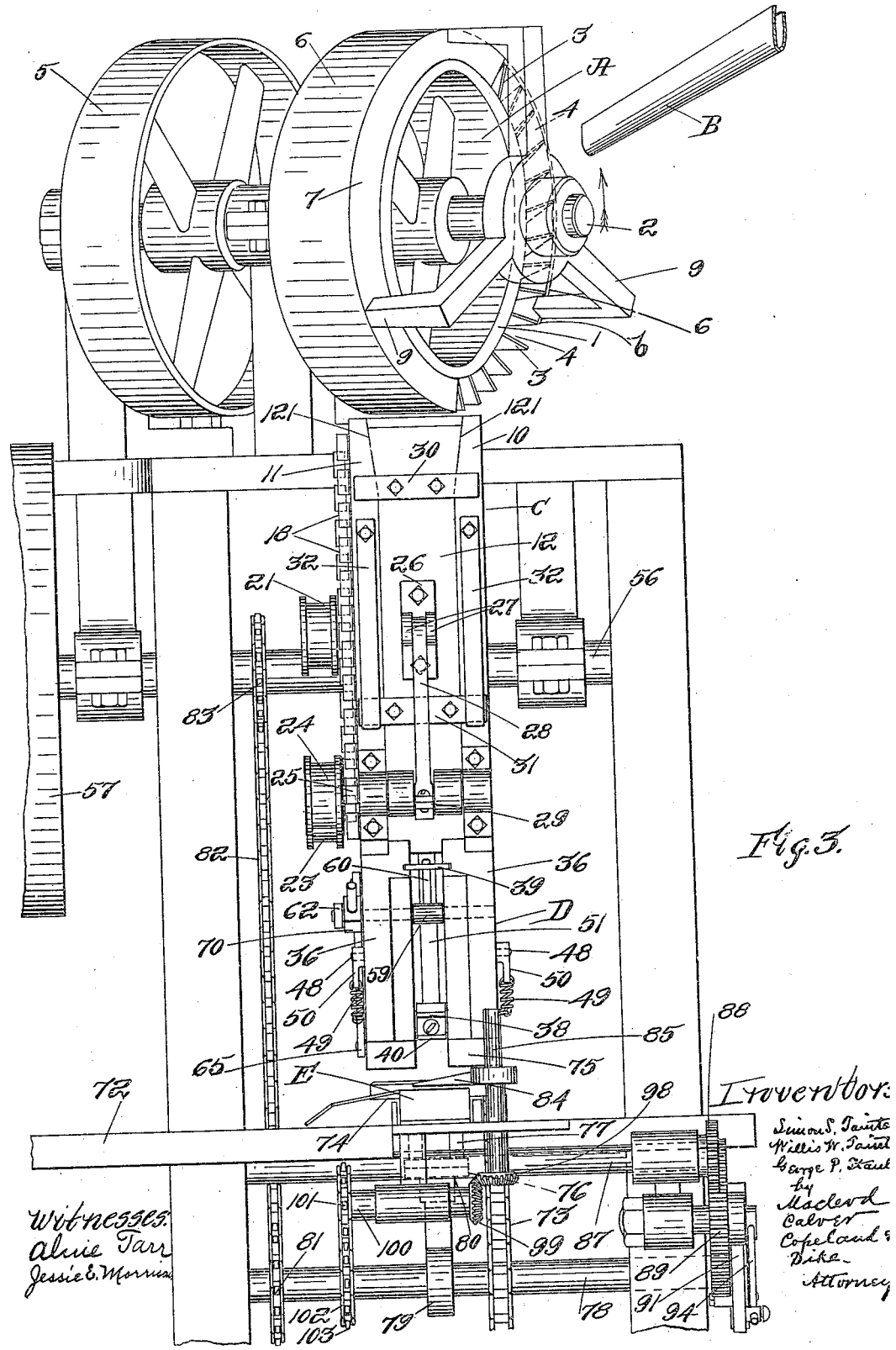
Figure 4:
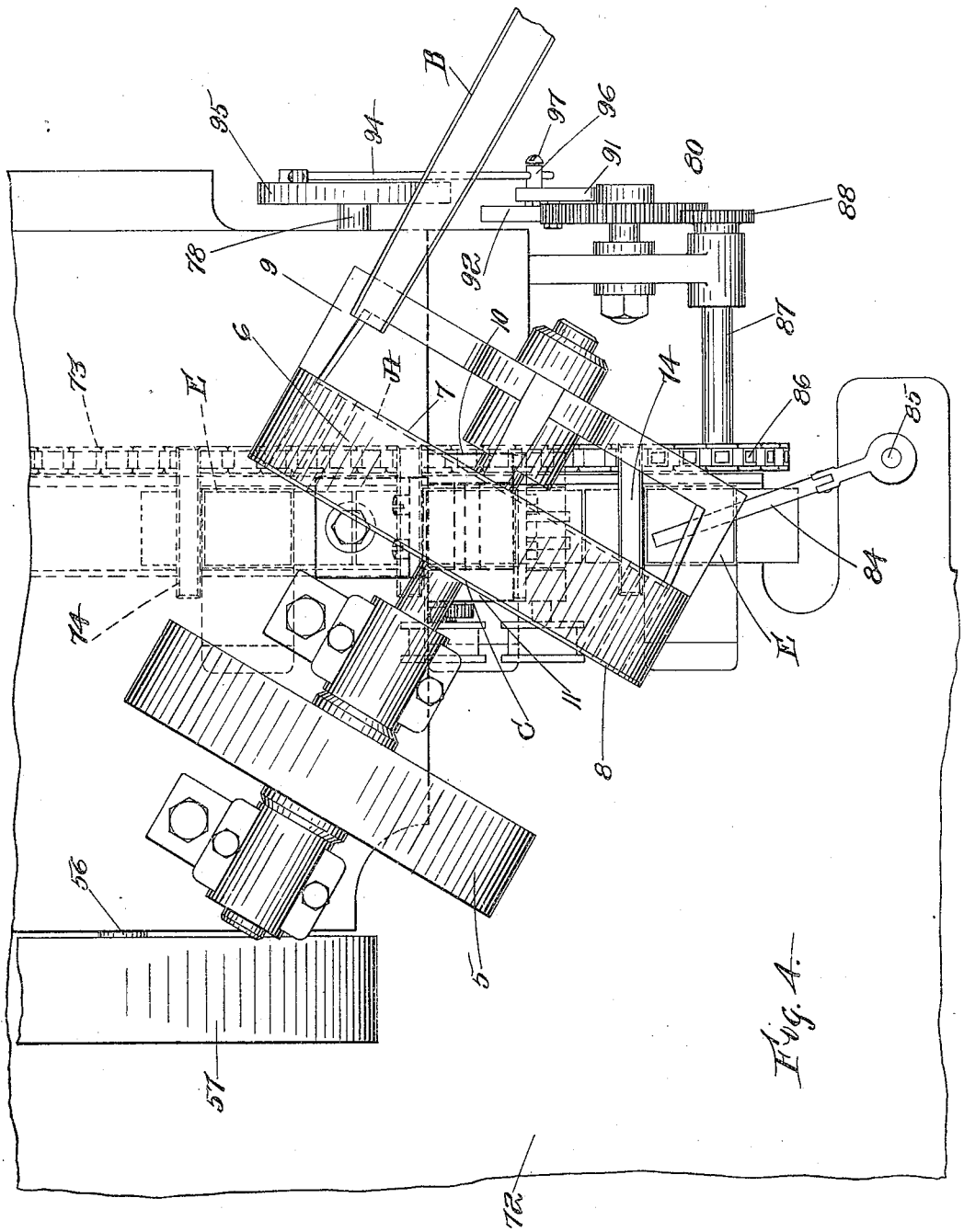
Figure 5:
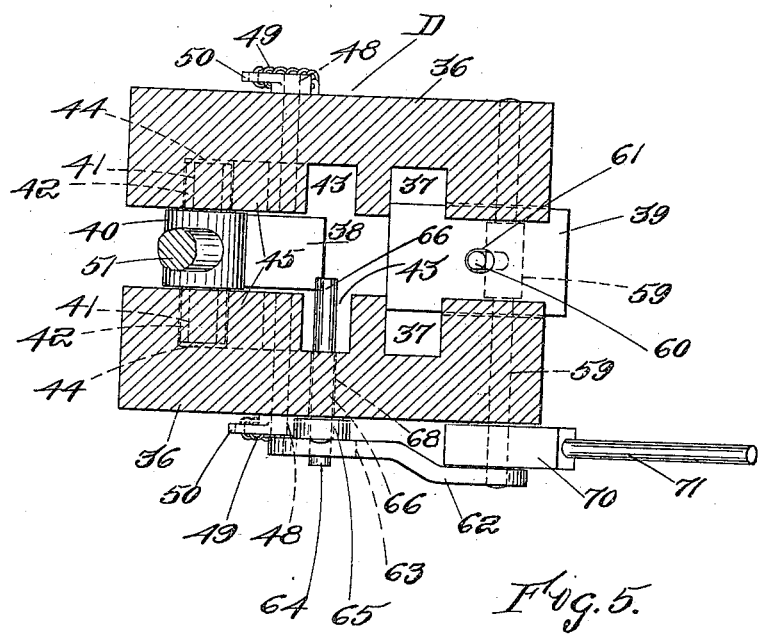

In the drawings, Figure 1 is a side elevation of a machine embodying our invention, certain parts being broken away for greater clearness. Fig. 2 is a vertical section from front to rear through the reservoir and measuring mechanism and showing the wheel conveyer stripped of its housing. Fig. 3 is a front elevation of the machine as viewed from the right of Fig. 1. Fig. 4 is a plan of the machine. Fig. 5 is a section on line 5—5 of Fig. 1.

Referring now to the drawings—A represents a rotary conveyer which receives the tooth-picks from a chute B leading from any general source of supply, preferably leading from the tumbling mechanism in which the tooth picks are finished, as it is convenient and economical because the tooth picks are boxed directly as they come from the toothpick making machine. The tooth picks are fed by the rotary conveyer A into the reservoir C which feeds them into the measuring mechanism D whence they pass into the boxes E, all of which will be more particularly hereinafter described.

The rotary conveyer A comprises a wheel 1 mounted on a shaft 2 and provided with a series of blades 3 inserted in the periphery and extending outwardly therefrom forming a series of buckets 4, disposed around the periphery of the wheel. The wheel is driven in the direction indicated by the arrow, by means of a pulley 5 mounted on a shaft 2, or by any other suitable driving mechanism. The picks are delivered from the chute B into the ends of the buckets 4 preferably on the rise of the bucket after the bucket passes above the center or axis of rotation, as shown in Fig. 3. The chute B is set at a pitch so that the picks will easily slide down, and is so located with relation to the conveyer that the picks are delivered into the ends of the buckets, and for that reason it is preferable to have the blades set at an angle to the periphery of the wheel at about the same pitch as the chute so that when the buckets come around into position to receive the picks from the chute, the bucket will be in alinement with the chute. Although the blades are set diagonally of the periphery of the wheel, it is preferable that they be radial to the center of the wheel, that is the plane of the blades would cut the axis of the wheel at an angle at the center.

In order to retain the picks within the buckets until each bucket has revolved around to a point just over the entrance to the reservoir, the wheel is provided with a housing comprising a peripheral curved guard or plate 6 and two side guards 7, 8, connected with the peripheral guard 6 and secured to a fixed frame 9. The curved peripheral guard 6, as plainly shown in Fig. 3, preferably begins at a point somewhat below the axis of the conveyer and extends around to the point where the picks are to leave the buckets to be delivered into the reservoir C. The side guard 8 which is on the opposite side of the conveyer wheel from that on which the picks are delivered from the chute B to the conveyer wheel, preferably extends the entire circumference of the wheel. The guard 7 which is on the side at which the picks are delivered to the conveyer is shortened or cut away for a portion of its length near the point of delivery from the chute B, as it is necessary for the buckets to be opened at the end in order for the picks to be delivered to the buckets as shown in Fig. 3. It is not necessary for the guard 7 to extend between the point of delivery into the reservoir C and the point at which the picks are delivered from the chute B to the buckets because on the upward rise of the buckets after the picks have been delivered to the reservoir C until they rise above the axis of the shaft 2 there will be no picks in the bucket.

It is important that the picks shall be kept in parallel relation to each other when received into the reservoir for the rotary conveyer. As they are parallel with each other in the buckets the entrance into the reservoir should register square with the buckets, and as the buckets are set diagonally of the periphery of the wheel the wheel is set so that the path of rotation of the conveyer will be in a plane which is at an angle with the plane passing through the tooth pick passage in the reservoir, that is, the wheel is set skewing with relation to the reservoir passage so as to bring the buckets in alinement with the entrance to the tooth pick passage when the picks are about to be delivered from the buckets into the reservoir.

The reservoir C comprises two stationary vertical plates 10 11, spaced apart a distance somewhat greater than the length of the tooth-picks and two side plates or bars 12, 13, the tooth picks falling broadside from the buckets into the top of the reservoir C with their ends pointing toward the end plates 10, 11, and their broad sides parallel with the side plates 12 13. The side plate 13 is stationary and the side plate 12 is vertically reciprocable. The plate 13 is provided with a series of rollers 14 which project into the path of the falling tooth-picks and the side bar 12 is provided with a series of teeth 15 which project into the path of the tooth picks, the upper side of the teeth 15 having a long backward slope 16 and the lower sides 17 of the teeth being horizontal so that when the bar 12 moves upward the long backward slope of the teeth will permit the bar to rise more easily and the picks will spread out into the space below the square bottom of the teeth and when the bar moves downward the square lower side of the teeth will push them down, the purpose of the movable bar being to prevent the picks from becoming too solidly massed and thereby choking the feed.

Means are provided to keep the slidable rollers 14 in constant rotation so that the picks will easily slide over them, and the teeth 15 not only aid in feeding the picks through the reservoir but also and especially they tend to prevent clogging of the picks in the reservoir. The teeth further prevent the picks falling end on, that is as they strike the teeth in descending they are returned to the horizontal position and thus pass down and are delivered horizontally as required.

The means shown for rotating the cylinders or rollers 14 is to provide each cylinder with a pinion 18, said pinions 18 being operatively connected together by an intermediate gear such as pinions 19, one of which is mounted on a shaft 20 which carries a pulley 21 connected by a belt 22 with suitable driving mechanism. Said belt 22 as shown rides over an idler pulley 23, and also around the pulley 24 which drives the shaft 25 for operating the reciprocating bar 12, as will be hereinafter described.

The toothed side bar 12 is given a vertically reciprocable or jigging movement for the purpose already mentioned. This movement may be given by any suitable mechanism. The mechanism for doing this which we employ, and which is shown in the drawings, is as follows:—Secured to the outer face of the bar 12 is a bracket 26 provided with ears 27 to which is pivoted a lever 28 actuated by an eccentric 29 driven by shaft 25.

In the position shown in the drawings, the reciprocable bar 12 is shown in its lowermost position. In order to prevent the bar 12 from being pushed into the passageway in the reservoir, cross-bars 30, 31, are provided, secured to the outer face of the reciprocable bar 12, the outer ends of which bear against the edges of the end plates 10 11. In order to prevent the bar 12 from falling outward, we provide two springs 32, the upper ends of which are secured to the edges of the plates 10 11. The lower ends of said springs are free, and press against the outer face of the lower cross-bar 31, thus giving an elastic pressure against the cross-bar 31 which will be sufficient to hold the reciprocable bar 12 against falling outward and at the same time will permit the vertical reciprocation of the bar 12 without undue friction. As shown in the drawings, the reciprocable bar 12 is in its lowermost position, the sides of the bar 12 toward their upper ends having outwardly flaring portions 121 which bear against the corresponding upwardly inclined edges of the end plates 10 11, thus forming a solid stop for the downward movement of the reciprocable bar 12.

The stationary side bar 13 is formed with inwardly projecting ribs 33 concaved at their lower part 35 to afford space for the cylinders or rollers 14 and having backwardly inclined upper faces 34, which are so disposed with relation to the beveled upper faces 16 of the teeth on the reciprocable bar 12 that the picks as they roll down upon the sloping faces of the teeth 15 will slide toward the sloping faces 34 of the fixed bar 13, whence they will slide down over the cylinders 14, thus giving to the picks a tendency to a zig-zag path of movement, and maintaining them in a horizontal position.

After the tooth-picks pass through the reservoir C they will be delivered to the measuring mechanism D whence they will pass to the box E. The measuring mechanism which we employ is an improvement upon the measuring mechanism shown in Patent No. 886,091, to S. S. Tainter, April 28, 1908. The measuring and filling mechanism will now be described.

The vertical side plates 36, 36 which form the sides of the measuring chute, have formed on their inner faces grooved ways 37 which receive the tooth-picks from the reservoir C and form a part of the measuring device. These grooved ways form a passage of a length slightly greater than the length of the picks, so as to allow an easy passage of the picks side downward.

There is provided a vertically reciprocable bottom 38 for the measuring device and a horizontal reciprocable cut-off 39 which is actuated to shut off the stream of tooth-picks entering the measuring conduit formed by the grooved ways 37 when the reciprocable bottom 38 has reached the bottom of its downward stroke, that is, the reciprocable bottom 38 is adapted to extend across the passageway through the measuring chute at the upper part thereof and to form a seat for the column of tooth picks in the reservoir C when the cut-off 39 is withdrawn. Means are provided whereby the said movable bottom 38 is caused to gradually descend in the grooved ways, allowing the column of tooth picks supported thereon to descend with it until the movable bottom 38 reaches the lower end of the measuring portion of the chute, and then the movable cut-off 39 is actuated to move forward through the column of tooth-picks in the upper part of the chute as shown in Fig. 1, thus leaving a column of picks between the under side of the cut-off 39 and the movable bottom 38 equal to the quantity required for filling one box. Means are provided whereby the movable bottom 38 is then withdrawn from the grooved passage way of the measuring device while the cut-off 39 still holds back the column of picks above the cut-off and as soon as the movable bottom 38 as above mentioned has withdrawn from supporting the column of picks in the measuring chute the column of picks below the cut-off will fall down into the box E which has been brought up beneath the measuring chute in the manner which will be hereinafter described. After the movable bottom 38 has been withdrawn it will be carried up outside of the measuring chute and then carried again transversely of the upper part of the measuring chute just below the cut-off 39 while the cut-off 39 still holds back the column of tooth picks above it. Then the cut-off 39 will be withdrawn so that the column of picks may rest upon the movable bottom 38 and the movable bottom 38 will again descend permitting the supported column of tooth picks to descend with it and the measured quantity will again be discharged as before. This general idea of the movable bottom and the cut-off is shown in the said Patent No. 886,091 above mentioned, but the mechanism for controlling it and actuating it is somewhat different. The movable bottom 38 extends laterally from a cylindrical head 40 having axles 41 provided with cylindrical anti-friction roller bearings 42 which in the downward movement of the bottom 38 move in vertical ways 43 formed in the side plates 36, 36. In the upward movement of the bottom plate 38 the axles move in vertical guide ways 44, formed in the plates 36, 36. Rising between the ways 43 and 44 and separating them from each other are ribs 45. At the lower end of each way 43 there is a horizontal passage 46 leading to the way 44 through which the axles of the cylindrical head 40 may pass from the ways 43 into the ways 44 to withdraw the bottom plate 38 from the tooth-pick way at the end of its downward movement. The grooved way 44 for the upward return of the cylindrical head 40 has an inclined portion 441 toward its upward end leading into the vertical way 43. The passage from the inclined portion 441 to the way 43 is normally closed, having spring-controlled latches 47, pivoted at their lower ends to arbors 48, the inclined upper end of the latches engaging with the inclined upper side of the slotted way 441 so that the latches can open only in one direction. The axles ride up through the inclined portions of the ways or slots 44. The cylindrical bearings 42 of the axles will engage the latches 47 turning them forward on their pivots thereby allowing the cylindrical bearings to ride past the beveled upper ends of the latches into the upper part of the vertical ways 43 and moving the bottom plate 38 across the tooth-pick passage 37 beneath the cut-off plate 39. As soon as the cylindrical bearings have passed by the latches 47 the latches will be thrown back into position by means of springs 49 connected with the arms 50 which are made fast to the arbors 48 on which the latches 47 are mounted.

Any suitable mechanism may be employed for giving the reciprocation to the cylindrical head 40 so as to cause the axles to move through the ways in which they travel. The means shown are as follows:—Connected with the cylindrical head 40 is a rod 51 which at its upper end is pivotally connected with a rod 52. Projecting from the rod 52 is a pin 53 which engages with a cam path 54 in a rotary cam 55 mounted on a shaft 56. Said shaft 56 is driven in any suitable way. As shown, it is provided with a pulley 57. A spring 58 connects the rod 51 with the rod 52 which always exerts a pull on the rod 51 and when the axles of the cylindrical head 40 have reached the bottom of the grooved ways 43 the pull of the spring 58 will move the axles through the horizontal slotted ways 46 into the lower end of the ways 44. The action of the cam 55 raises the rod 52 from the position shown in Fig. 1, causing the axles of the head 40 to enter the inclined portions 441 of the ways 44 and said inclined ways cause the rod 51 to move toward the right into the vertical ways 43 thus bringing the movable bottom 38 into a position transversely of the measuring chute below the cut-off and column of tooth picks in the reservoir.

The mechanism for actuating the cut-off is as follows:—Journaled in the side plates 36 is a rocker-shaft 59 from which a pin 60 projects upwardly and engages in a slot 61 in the cut-off plate 39. Mounted fast on shaft 59 is a lever 62 which extends in a horizontal direction along on the outside of one of the side plates 36 and is provided near its forward end with an elongated horizontal slot 63 with which there engages a pin 64 projecting from a vertical reciprocable bar 65. This bar 65 is provided with pins 66 and 67 near its upper and lower ends which engage respectively with vertically elongated slots 68 and 69 and with the inner faces of the side plates 36. Said vertical elongated slots 68 and 69 form guide ways which direct and limit the vertical reciprocation of the lever 65. When the bar 65 is moved upward it will cause the rocker-shaft 59 to turn in a direction to turn the pin 60 projecting therefrom to the right as viewed in Fig. 1 thereby moving the cut-off plate 39 to the right and out of the tooth-pick passage 37. When the said bar 65 is thereafter caused to descend into the position shown in Fig. 1 it will move the cut-off plate in a direction crosswise of the tooth-pick passage 37, as shown in Fig. 1. When the axles 41 have passed from the inclined portion 441 of the way 44 into the vertical ways 43 and just before reaching the upper end of the movement, the cylindrical head 40 will engage the pin 66 and carry the pin 66 upward in the elongated slot 68 thereby raising the bar 65 and through the intermediate mechanism, as previously described, turning the rocker-shaft 59 in a direction to move the cut-off 39 backward out of the tooth pick passage. When the bottom plate 38 descends the head 40 will near the end of its movement, engage the pin 67 thereby moving the bar 65 downward as permitted by the elongated slots 68 69 into the position shown in Fig. 1, and thereby turning the rocker-shaft 59 in a direction to move the cut-off plate 39 again into the tooth pick passage. Mounted fast upon the shaft 59 is a block 70 from which projects a handle 71 whereby the cut-off may be operated by hand if desired.

Boxes E are moved along upon a table 72 by means of an endless chain 73 which is provided with laterally projecting blocks or fingers 74 spaced at intervals apart and adapted to engage boxes one by one to bring them to a position beneath the measuring chute D. The chain 73 is given an intermittent movement, the distance between the blocks 74 being equal to the distance that the chain travels at each period of movement so that a box will be left in position under the measuring chute at the end of each period of movement. It is desirable that the box shall be brought up close to the bottom of the outlet from the measuring chute when the tooth picks are discharged into it. Just below the measuring chute and on each side of the passage way are the downwardly extending side guides or wings 75, and it is desirable that the box E shall be brought up nearly to the bottom of said side guides 75. In order, however to avoid any friction of the heaped-up mass of tooth-picks in the box with the lower sides of the guide ways 75 when the carrier chain moves to carry the filled box away, the upper surface of the table 72 should be enough lower than the bottom of the side guides 75 so that there will be a space between the top of the box and the bottom of the side guides before the box begins to move. We therefore provide elevator mechanism for raising the box from its normal position on the table to a position closer up to the bottom of the guides 75. The mechanism which we provide is as follows:—Secured to the underside of the table 72 is one end of a plate spring 76, whose forward end is free and carries upon its upper side four upwardly projecting pins 77 which extend up through slots in the table at the point over which the box comes to a state of rest at the end of the period of movement of the chain. Mounted on a shaft 78 is a cam 79 which is adapted to engage with a projection 80 on the under side of the plate 76 and thereby move the free end of the plate 76 upward so that the pins 77 will raise the box from the table close up under the guides 75 of the measuring chute as shown in Fig. 2. The cam 79 and the driving mechanism therefor is so timed with relation to the movement of the carrier chain, that the elevating movement will occur at the end of each period of movement of the carrier chain. The said shaft 78 which drives the elevator cam 79 is driven through suitable means by the same shaft 56 which controls the movement of the movable bottom and cut-off of the measuring mechanism. The said connections as shown consist of a sprocket wheel 81 mounted on shaft 78 driven by a chain 82 which connects with the sprocket 83 mounted on said shaft 56. As soon as the carrier chain starts after the box is filled the projections 80 on the under side of the spring 76 will ride off of the cam 79 and the spring 76 will therefore drop back into its normal position leaving the box upon the table in position to be engaged by the finger 74 and moved forward while another empty box is being brought to position beneath the measuring chute.

As previously stated the carrier chain is given an intermittent movement. The mechanism for doing this is as follows: The chain 73 passes around a sprocket wheel 86 mounted on shaft 87 at the forward part of the machine and passes around a sprocket at the rear of the machine (not shown because the machine is broken away) and around an idler (also not shown). Mounted also on shaft 87 is a pinion 88 which engages with a gear wheel 89 fast on a shaft 90. Mounted loose on said shaft 90 is a rocker-arm 91 pivoted to which is a pawl 92 which is adapted to engage with the teeth of the gear 89, being normally held in engagement with said gear by a spring 93. Flexibly connected with the rocker-arm 91 is a crank arm 94 at one end thereof, the other end of said crank arm being eccentrically connected with a disk 95 mounted fast on shaft 78. During the first half of each rotation of the disk 95 the crank arm 94 will move forward, that is to the right as shown in Fig. 2, turning the rocker-arm 91 also forward and downward and by means of the pawl 92 which is engaged with the gear 89, gear 89 will be partially rotated according to the length of the stroke of the crank arm. During the remaining half of the rotation of the disk 95 the crank 94 will be moved backward turning back also the rocker arm 91, and the pawl 92 will trail back over the teeth of the gear 89 without moving the gear 89. The partial rotation of the gear 89, as above described, gives also a partial rotation to the pinion 88 and therefore to the shaft 87 and the sprocket 86 which carries the feed chain 73. The crank rod 94 is adjustably connected with the rocker arm 91 by passing through a stud 96 which projects from the side of the rocker arm 91 and is clamped therein by a set screw 97 (see Figs. 2, 3 and 4). By means of the set-screw 97 the crank rod 94 may be adjusted to vary the length of this operative portion and thereby varying the length of the stroke.

As the tooth picks sometimes fill the box a little too full there is provided means for leveling off the heaped up tooth-picks in a box after the box passes from beneath the measuring mechanism. This leveling mechanism consists of a horizontal arm 84 mounted on a vertical rotary shaft 85 so that the arm 84 sweeps around in a circle with its lower edge slightly above the top of the box as shown in Fig. 2. Means are provided for actuating said leveling arm 84, which is as follows:—Mounted on the lower end of the shaft 85 is a beveled gear 98 which engages with a beveled gear 99 on shaft 100. Mounted also on shaft 100 is a sprocket 101 over which runs a sprocket chain 102 which runs over a sprocket 103 mounted on shaft 78. Thus the shaft 78 is driven by its connection with the shaft 56. This shaft 56 drives the movable bottom and the cut-off of the measuring chute; it also drives the feed chain for the boxes and thereby controls the intermittent feed and it drives the leveling mechanism and controls the box-elevator mechanism. The driving shaft 2 for the wheel conveyer is independently operated and the pulley 21 for the feed slide 12 is also independently operated. After the box has passed under the leveling arm 84, the box will be removed by the operator by hand, or by any suitable way.

What we claim is;

1. In a machine for boxing tooth picks, a rotary wheel conveyer having on its periphery a series of buckets formed by blades set diagonally of the periphery.

2. In a machine for boxing tooth picks, a rotary wheel conveyer having on its periphery a series of buckets formed by blades set parallel with each other and diagonally of the periphery.

3. In a machine for boxing tooth picks, a rotary wheel conveyer having on its periphery a series of buckets formed of blades set parallel with each other and diagonally of the periphery and radially to the wheel.

4. In a machine for boxing tooth picks, a rotary wheel conveyer having on its periphery a series of buckets formed of blades set parallel with each other and diagonally of the periphery, a feed chute opposite one side of the path of the buckets on the side against the higher end of the diagonally disposed blades and pitched at a downward angle substantially parallel with the angle of inclination of the blades.

5. In a machine for boxing tooth picks, a rotary wheel conveyer having on its periphery a series of buckets formed of blades set parallel with each other and diagonally of the periphery, a feed chute opposite one side of the path of the buckets on the side against the higher end of the diagonally disposed blades and inclined downwardly substantially parallel with the angle of inclination of the blades and a reservoir chute below the conveyer having a tooth pick passage in line with the diagonally disposed buckets of the conveyer.

6. In a machine for boxing tooth picks, a rotary wheel conveyer having on its periphery a series of buckets formed of blades set parallel with each other and diagonally of the periphery, a feed chute opposite one side of the path of the buckets on the side against the higher end of the diagonally disposed blades and inclined downwardly substantially parallel with the angle of inclination of the blades, and a stationary housing closing the ends of the buckets on the ends opposite the receiving ends throughout the entire circumference and closing the receiving ends and tops from a point somewhat above the receiving point around to the discharge point.

7. In a machine for boxing tooth picks, a measuring chute, a reservoir chute which delivers picks to the measuring chute, said reservoir chute having a vertically vibrating side formed with teeth which project into the path of the tooth picks as they pass through the reservoir chute.

8. In a machine for boxing tooth picks, a measuring chute, a reservoir chute which delivers picks to the measuring chute, said reservoir chute having a vertically vibrating side formed with teeth which project into the path of the tooth picks as they pass through the reservoir chute, said teeth being formed with relatively long downwardly sloping upper edges and shorter lower edges.

9. In a machine for boxing tooth picks, a measuring chute, a reservoir chute which delivers picks to the measuring chute, said reservoir chute having a vertically vibrating side formed with teeth which project into the path of the tooth picks as they pass through the reservoir chute, and a row of parallel rollers in front of the opposite side wall of the reservoir chute.

10. In a machine for boxing tooth picks, a measuring chute a reservoir chute which delivers picks to the measuring chute, said reservoir chute having a vertically vibrating side formed with teeth which project into the path of the tooth picks as they pass through the reservoir chute, the opposite side being formed with a vertical row of projections extending into the feed passage and having a sloping upper edge and cylindrical rollers in front of said projections.

11. In a machine for boxing tooth picks, a measuring chute a reservoir chute which delivers picks to the measuring chute, said reservoir chute having a vertically vibrating side formed with teeth which project into the path of the tooth picks as they pass through the reservoir chute, the opposite side being formed with a vertical row of projections extending into the feed passage and having a sloping upper edge and cylindrical rollers in front of said projections, said rollers being opposite the recesses between the teeth of the vibrating side.

12. In a machine for boxing tooth picks, a measuring chute a reservoir chute which delivers picks to the measuring chute, said reservoir chute having a vertically vibrating side formed with teeth which project into the path of the tooth picks as they pass through the reservoir chute, said vibrating side being movable laterally, a yielding guide plate which holds said vibrating side against improper displacement, and a spring which holds said guide plate in yielding pressure against said vibrating side.

13. In a machine for boxing tooth picks, a rotary wheel conveyer having on its periphery a series of buckets formed of blades set parallel with each other and diagonally of the periphery, a feed chute opposite one side of the path of the buckets on the side against the higher end of the diagonally disposed blades and inclined downwardly substantially parallel with the angle of inclination of the blades, and a reservoir chute below the conveyer having a tooth pick passage in line with the diagonally disposed buckets of the conveyer, said reservoir chute having a vertically vibrating side formed with teeth which project into the tooth pick passage of the reservoir, a measuring chamber below the reservoir chute, and means for controlling the delivery of picks from the reservoir to the measuring chamber.

14. In a machine for boxing tooth picks, a rotary wheel conveyer having on its periphery a series of buckets formed of blades set parallel with each other and diagonally of the periphery, a feed chute opposite one side of the path of the buckets on the side against the higher end of the diagonally disposed blades and inclined downwardly substantially parallel with the angle of inclination of the blades, and a reservoir chute below the conveyer having a tooth pick passage in line with the diagonally disposed buckets of the conveyer, said reservoir chute having a vertically vibrating side formed with teeth which project into the tooth pick passage of the reservoir, a measuring chamber below the reservoir chute, and means for controlling the delivery of picks from the reservoir to the measuring chamber, and means for controlling the discharge from the measuring chamber.

15. In a machine for boxing tooth picks, a measuring chute, means for controlling the outlet from the measuring chute, an intermittently movable box carrier which is adapted to move boxes into a position beneath the outlet from the measuring chute, mechanism for raising the boxes into a position close to the outlet from the measuring chute.

16. In a machine for boxing tooth picks, a measuring chute, means for controlling the outlet from the measuring chute, an intermittently movable carrier which is adapted to move boxes into a position beneath the outlet from the measuring chute, mechanism for raising the boxes into a position close to the outlet from the measuring chute, the mechanism for controlling the outlet from the measuring chute also controlling the said elevating mechanism.

17. In a machine for boxing tooth picks, a measuring chute, a movable bottom for the measuring chute, a table beneath the measuring chute to support the boxes, mechanism for moving the boxes intermittently along on the table at predetermined distances apart with a position of rest for each box beneath the outlet from the measuring chute, mechanism for lifting the box from the table up to a position closer to the measuring chute during the period of dwell of the moving mechanism and for lowering the box to the table, mechanism for actuating the movable bottom of the measuring chute to intermittently close and open the outlet from the measuring chute, and means for controlling the time of movement of the said movable bottom and said elevator whereby the box will be raised when the said outlet is open and lowered after the outlet is closed.

18. In a machine for boxing tooth picks, a measuring chute having a movable bottom means for actuating said movable bottom to open and close the outlet, mechanism for intermittently positioning boxes beneath the outlet from the measuring chute, and means for leveling the tooth picks in the box.

19. In a machine for boxing tooth picks, a measuring chute, having a movable bottom, means for actuating said movable bottom to open and close the outlet, mechanism for intermittently positioning the boxes beneath the outlet from the measuring chute, means for leveling the tooth picks in the box, and means for transferring the filled boxes from the position beneath the measuring chute to a position for operation of the leveling mechanism.

20. In a machine for boxing tooth picks, a measuring chute having a movable bottom, means for actuating said movable bottom to open and close the outlet, mechanism for intermittently carrying boxes at predetermined distances apart successively to a position below the outlet from the measuring chute, mechanism for lifting the box from the position where it is left by the carrier below the chute to a closer position to the mouth of the measuring chute above the carrier, and lowering it again to the carrier, mechanism for leveling the tooth picks in the box and mechanism for controlling the actuating mechanism for the movable bottom of the measuring chute, the box carrier and the elevator whereby the carrier and the elevator mechanism will be operated while the outlet for the measuring chute to the box is closed and will be stationary while the outlet is open.

21. In a machine for boxing tooth picks, a measuring chute having a movable bottom, means for actuating said movable bottom to open and close the outlet, mechanism for intermittently positioning boxes beneath the outlet from the measuring chute and means for leveling the tooth picks in the box, said leveling mechanism comprising a horizontal arm movable in a horizontal plane just over the top of the box when it is at a position of rest after the carrier has transferred it from beneath the measuring chute, and mechanism for actuating said leveling arm to sweep across the top of the box.

22. In a machine for boxing tooth picks, a measuring chute having a movable bottom, means for actuating said movable bottom to open and close the outlet, mechanism for intermittently positioning boxes beneath the outlet from the measuring chute, and means for leveling the tooth picks in the box, said leveling mechanism comprising a horizontal arm movable in a horizontal plane just over the top of the box when it is at a position of rest after the carrier has transferred it from beneath the measuring chute, and mechanism for actuating said leveling arm to sweep across the top of the box, common driving mechanism for the movable bottom, the box positioning mechanism and the leveling mechanism.

In testimony whereof we affix our signatures, in presence of two witnesses.

SIMON S. TAINTER.
  WILLIS W. TAINTER.
  GEORGE P. STANLEY.

Witnesses to Simon S. Tainter:
 ROBERT L. KIMBALL,
 JOHN G. BUTTS.

Witnesses to Willis W. Tainter and George P. Stanley:
 CHARLES P. RICKER,
 GEORGE W. RICKER.